(12) United States Patent
Emmons et al.

(10) Patent No.: US 7,095,943 B2
(45) Date of Patent: Aug. 22, 2006

(54) MULTIFUNCTIONAL OPTICAL ASSEMBLY

(75) Inventors: Robert M. Emmons, St. Paul, MN (US); David J. Lamb, Oakdale, MN (US); Yaoqi J. Liu, Maplewood, MN (US); Ying-Yuh Lu, Woodbury, MN (US); Larry A. Meixner, Woodbury, MN (US); Robert S. Moshrefzadeh, Oakdale, MN (US); Richard J. Pokorny, Maplewood, MN (US); Steven J. Rhyner, St. Paul, MN (US); Philip E. Watson, Oakdale, MN (US); Leland R. Whitney, St. Paul, MN (US); Jie Yang, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/297,607

(22) Filed: Dec. 8, 2005

(65) Prior Publication Data

US 2006/0083478 A1  Apr. 20, 2006

Related U.S. Application Data

(62) Division of application No. 10/156,674, filed on May 28, 2002, now Pat. No. 7,010,212.

(51) Int. Cl.
*G02B 6/10* (2006.01)

(52) U.S. Cl. ............... 385/146; 385/901; 362/602

(58) Field of Classification Search ........ 359/591–598, 359/833, 837; 385/146, 901; 362/31, 602
See application file for complete search history.

(56) References Cited

U.S. PATENT DOCUMENTS

| | | | |
|---|---|---|---|
| 4,123,140 A | 10/1978 | Ryan | 350/105 |
| 5,268,782 A | 12/1993 | Wenz et al. | 359/81 |
| 5,394,255 A | 2/1995 | Yokota et al. | 359/49 |
| 5,545,280 A | 8/1996 | Wenz | 156/234 |
| 5,552,907 A | 9/1996 | Yokota et al. | 359/49 |
| 5,598,280 A | 1/1997 | Nishio et al. | 349/57 |
| 5,825,542 A | 10/1998 | Cobb, Jr. et al. | 359/487 |
| 5,880,886 A | 3/1999 | Millner | 359/599 |
| 5,917,664 A | 6/1999 | O'Neill et al. | 359/831 |
| 6,052,164 A | 4/2000 | Cobb, Jr. et al. | 349/64 |
| 6,091,547 A | 7/2000 | Gardiner et al. | 359/625 |
| 6,111,696 A | 8/2000 | Allen et al. | 359/495 |
| 6,117,530 A | 9/2000 | Jonza et al. | 428/212 |
| 6,166,787 A | 12/2000 | Akins | 349/57 |
| 6,166,797 A | 12/2000 | Bruzzone et al. | 349/155 |
| 6,197,397 B1 | 3/2001 | Sher et al. | 428/42.3 |

(Continued)

FOREIGN PATENT DOCUMENTS

WO   WO 01/79895   10/2001

*Primary Examiner*—Akm Enayet Ullah
*Assistant Examiner*—Daniel Petkovsek
(74) *Attorney, Agent, or Firm*—Stephen W. Buckingham

(57) ABSTRACT

An integrated optical assembly including a light management component with an entry surface and a light delivery component having an exit surface attached to the entry surface of the light management component is disclosed The light management component and the light delivery component are attached together in a manner that defines voids between the entry surface of the light management component and the exit surface of the light delivery component. The voids between the light management component and the light delivery component may provide an air interface over substantial portions of the entry surface of the light management component.

70 Claims, 8 Drawing Sheets

U.S. PATENT DOCUMENTS

| | | | |
|---|---|---|---|
| 6,239,907 B1 | 5/2001 | Allen et al. | 359/443 |
| 6,268,961 B1 | 7/2001 | Nevitt et al. | 359/488 |
| 6,356,391 B1 | 3/2002 | Gardiner et al. | 359/628 |
| 6,379,016 B1 | 4/2002 | Boyd et al. | 362/31 |
| 6,381,068 B1 | 4/2002 | Harada et al. | 359/443 |
| 6,747,801 B1 | 6/2004 | Umemoto et al. | 359/599 |
| 6,755,545 B1 | 6/2004 | Lee | 362/31 |
| 2001/0036013 A1 | 11/2001 | Allen et al. | 359/599 |

MULTIFUNCTIONAL OPTICAL ASSEMBLY

CROSS REFERENCE TO RELATED APPLICATIONS

This application is a divisional of U.S. Ser. No. 10/156,674 filed on May 28, 2002 now U.S. Pat. No. 7,010,212, now allowed, the disclosure of which is herein incorporated by reference.

FIELD OF THE INVENTION

The present invention relates generally to an optical assembly. More particularly, the invention relates to a multifunctional optical assembly for use in a display system.

BACKGROUND

A typical optical display system contains a light source that is required to observe the information presented by the display. In battery powered equipment like laptop computers, the light source can represent a substantial fraction of the total power draw of the equipment. Therefore, reducing the amount of power required to produce a given luminance can increase battery life, which may be especially desirable in battery powered equipment.

The 3M brand Brightness Enhancement Film (BEF) available from the 3M Company of St. Paul, Minn., is one type of optical film that can be used to address this problem. BEF and similar films typically include an array of prisms on one surface that are large in comparison with the wavelengths of light. The structures can increase on-axis brightness of optical display systems by redirecting off-axis light and recycling the on-axis light such that it eventually emerges from the display on-axis, i.e., generally directed toward a viewer. In use, these films typically increase on-axis luminance at the expense of off-axis luminance in one or two dimensions. In this fashion, the material can help the display designer achieve the desired amount of on-axis luminance with reduced power consumption. Various embodiments of BEF and other similar films having structured surfaces are described in, e.g., U.S. Pat. No. 5,394,255 (Yokota et al.); U.S. Pat. No. 5,552,907 (Yokota et al.); U.S. Pat. No. 5,917,664 (O'Neill et al.); U.S. Pat. No. 6,052,164 (Cobb, Jr. et al.); U.S. Pat. No. 6,091,547 (Gardiner et al.); and U.S. Pat. No. 6,111,696 (Allen et al.).

Brightness enhancement is achieved with such prismatic structured surface films through a process of reflection and refraction that preferably includes light recycling. When used in preferred backlight configurations, prismatic structured surface films transmit light in the direction of the viewer (usually directly in front of the LCD) that would otherwise leave the screen at a high angle (missing the viewer).

In order for a prismatic structured surface film to direct light into a narrower angular exit profile toward the user, the film often includes a planar or nearly planar entry surface (on the opposite side of the film from the prisms) that includes an interface with air or another material with a sufficiently low index of refraction. The entry surface generally prohibits light from entering the film at internal angles greater than about 40 degrees from a normal direction defined by the entry surface.

To operate more efficiently, the entry surface of the prismatic structured surface film is typically separated by an air gap from other components in the display system so that the refraction characteristics of light entering the prismatic structured surface film through its entry surface are not affected by the generally higher indices of refraction of, e.g., a diffusing layer, light guide, etc. For example, air has an index of refraction of one (1), while polymers used to construct the diffusing layers typically have a higher index of refraction that is closer to the index of refraction of the materials used to manufacture the prismatic structured surface film. As a result, light refraction at a polymer interface is different than refraction of light at an air interface. Current techniques for manufacturing optical display systems that include prismatic structured surface films with entry surfaces commonly rely on the air gaps that will inherently exist between two films layered with each other in the absence of an adhesive or other agent that would optically couple the two layers.

This approach can, however, increase the cost of assembling the optical display because of the need to assemble the prismatic structured surface film with the other components in the optical display system. The layering approach may also lead to inconsistencies in appearance of the optical display as the air gap between the entry surface of the prismatic structured surface film and other components adjacent the entry surface varies over the entry surface. For example, in some areas the entry surface may be in contact with an adjacent component in a manner that negatively affects the refraction of light into film at the entry surface.

SUMMARY OF THE INVENTION

The present invention provides an integrated optical assembly including a light management component with an entry surface and a light delivery component having an exit surface attached to the entry surface of the light management component. The light management component and the light delivery component are attached together in a manner that defines voids between the entry surface of the light management component and the exit surface of the light delivery component.

The voids between the light management component and the light delivery component may provide advantages when the light management component is constructed in a manner such that its functioning is improved when, e.g., an air interface, can be maintained over substantial portions of the entry surface. Although the voids may often be occupied by air, it will be understood that any other gas or gases that provide a desirable index of refraction differential with the entry surface may occupy the voids. For example, the voids may be occupied by one or more gases other than air. Furthermore, although the voids may be referred to in the plural, it should be understood that the voids as depicted in the figures described below may, in fact, be part of a continuous void interrupted by structures designed to maintain the void(s) between the light management component and the light delivery component.

As a result, optical film assemblies according to the present invention may substantially retain the refraction characteristics of the light management component while providing an integrated multifunctional optical assembly.

As used herein, a "light management component" is defined as an optical device (film, body, etc.) that is operable to direct at least a portion of incident light in a desired direction or directions through refraction, reflection, total internal reflection, and/or frustrated total internal reflection.

As used herein, a "light delivery component" is an optical device (film, body, etc.) that includes an exit surface, with light exiting the exit surface and traveling towards the entry surface of the light management component. Light may also exit other surfaces of the light delivery component.

The light management component and/or the light delivery component (when applicable) used in connection with an optical assembly according to the present invention may be described as exhibiting optical gain as described in U.S. Pat. No. 5,917,664 (O'Neill et al.). The optical gain is preferably one (1) or higher.

Because the light management component and the light delivery component are attached to each other into an integrated optical assembly, manufacturing may be simplified, the integrity of both components (the light management component and the light delivery component) may be improved, and the cost of optical display systems incorporating the integrated optical assemblies may be decreased.

In one aspect, the present invention provides an optical assembly including a light management component with an entry surface and a light delivery component with an exit surface facing the entry surface of the light management component. The exit surface of the light delivery component is attached to the entry surface of the light management component at one or more attachment points, the one or more attachment points defining unfilled voids located between the exit surface and the entry surface. One or both of the light management component and the light delivery component exhibit an optical gain of one or more.

In another aspect, the present invention provides an optical assembly including a light management component with an entry surface, wherein the light management component exhibits an optical gain of one or more for light entering its entry surface. The optical assembly also includes a release liner facing the entry surface of the light management component and curable adhesive located between the release liner and the entry surface of the light management component, wherein the curable adhesive is attached to the entry surface and defines voids between the release liner and the entry surface of the light management component.

These and other features and advantages of the invention may be described below in connection with some illustrative embodiments of the invention.

DETAILED DESCRIPTION OF ILLUSTRATIVE EMBODIMENTS OF THE INVENTION

In the following detailed description of the embodiments, reference is made to the accompanying drawings which form a part hereof, and in which are shown, by way of illustration, specific embodiments in which the invention may be practiced. It is to be understood that other embodiments may be utilized and structural changes may be made without departing from the scope of the present invention.

Figure 1:
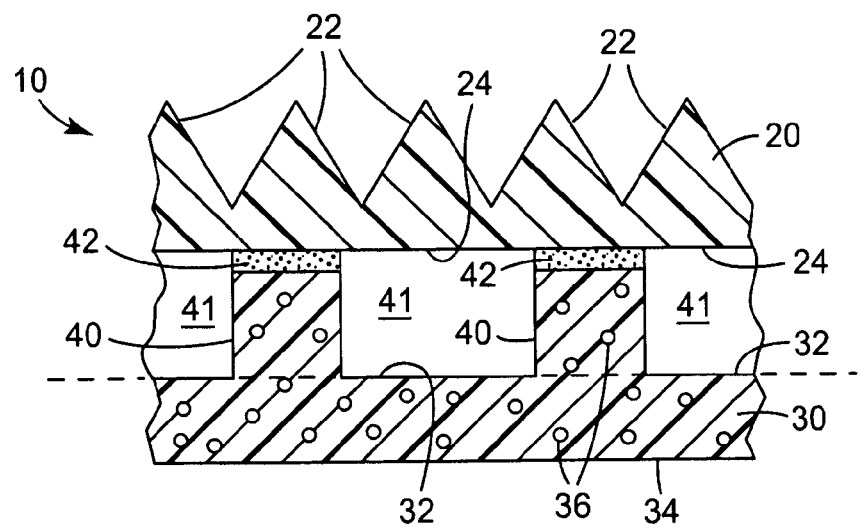
FIGS. 1–12 are partial cross-sectional diagrams of various illustrative optical assemblies according to the present invention.
Figure 1A:
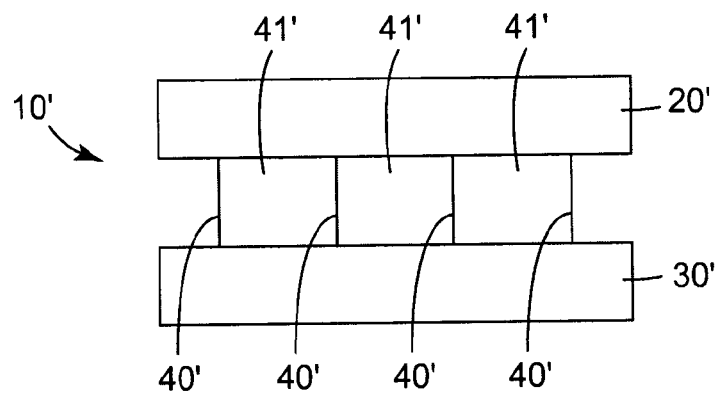
FIG. 1A is a schematic diagram of one optical assembly according to the present invention.

In some embodiments, the present invention as depicted in FIG. 1A provides an optical assembly 10' that includes a light management component 20' integrated with a light delivery component 30'. The attachment between the two components 20' and 30' is such that voids 41' are created between them and between attachment points 40' at which the light management component 20' and the light delivery component 30' are attached.

The voids 41' are unfilled voids, i.e., they typically include one or more gases such as, e.g., air, nitrogen, etc. The unfilled voids 41' preferably have an index of refraction that is substantially less than the surrounding materials, in some instances, for example, it may be preferred that the voids have an index of refraction of about one (1).

In many instances, the light management component relies on the refraction of light entering an entry surface such that the light exiting from an exit surface of the light delivery component is redirected into, e.g., a desired range of angles that may, e.g., enhance viewing, brightness, etc. In many instances, it may be desirable that the refractive index differential at the entry surface of the light management component be relatively large. For example, it may be desirable that the light management component be manufactured of a polymer or other material with a relatively high index of refraction (e.g., polycarbonate with an index of refraction of 1.586) and that the entry surface be exposed to air (with its refractive index of 1.0). Such an interface may attain a desired level of refraction for light entering the light management component through its entry surface.

The light delivery component may be, e.g., a diffuser to diffuse light before it enters the entry surface of the light management component. The diffusion may be provided to, e.g., obscure features, homogenize the light, change the dispersion of light exiting the light delivery component, change the approach angle of light incident on the entry surface of the light management component, etc. In another alternative, the light delivery component may be, e.g., a light guide that provides light distributed over the entry surface of the light management component.

Because the refraction characteristics of light at an interface are a function of the ratio of indices of refraction at that interface, spacing between the light management component and the light delivery component may be used to control the performance of the optical assembly as a whole. In many instances, the light management component and the light delivery component may often be manufactured of materials with similar indices of refraction. As a result, areas of contact between the entry surface of the light management component and the light delivery component will exhibit a smaller index of refraction differential than would be seen between, e.g., an air/entry surface interface. That smaller index of refraction differential may negatively affect performance of the light management component and, thus, the optical assembly as a whole.

To retain the refraction characteristics of light entering the entry surface of the light management component, the present invention includes unfilled voids between the entry surface of the light management component and the exit surface of the light delivery component. Outside of the portions of the entry surface occupied by the voids, substantially all of the exit surface of the light delivery component is preferably attached to the entry surface of the light management component within the optical assembly.

The voids may be defined, in some embodiments, by spacers located between the light management component and the light delivery component, with the spacers occupying a portion of the volume between the light management component and the light delivery component. In many instances, the spacers may be integral with the light management component and/or the light delivery component.

The spacers occupy only a portion of the entry surface of the light management component. For example, it may be preferred that the voids occupy half or more of the entry surface of the light management component. In another example, it may be desired that the voids occupy 90% or more of the entry surface of the light management component while the spacers occupy the remaining 10% or less of the entry surface of the light management component. Alternatively, the voids occupy 95% or more of the entry surface of the light management component while the spacers occupy 5% or less of the entry surface of the light management component. As such, a significant portion of the entry surface of the light management component is occupied by the voids such that the refraction characteristics of light entering the light management component through the entry surface are retained even though the light delivery component is integrated with the light management component.

Figure 5:
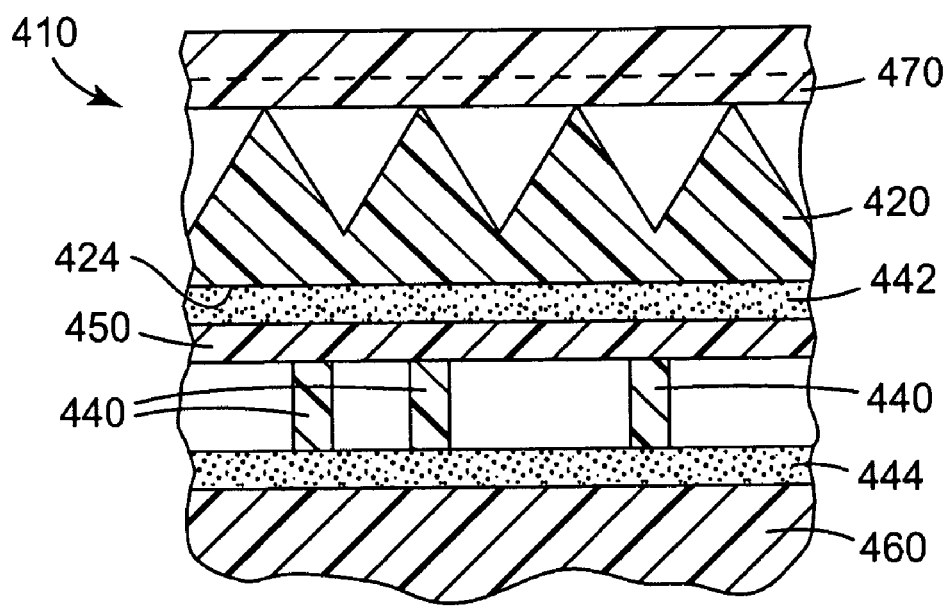
Figure 6:
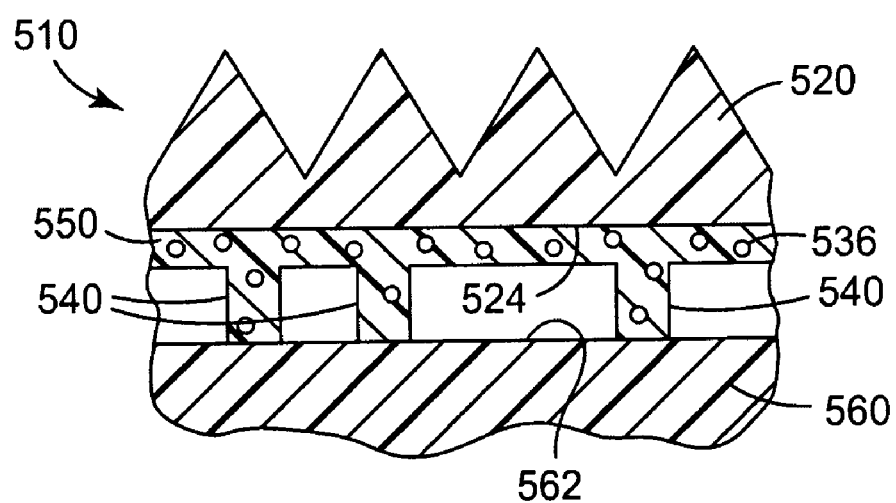

As will be seen below, the voids may be defined by a variety of structures interposed between the light management component and the light delivery component. As such, the voids may be defined as including an exit surface proximate the light management component, i.e., a surface through which light exits the void before reaching the entry surface of the light management component. Although the exit surface of the void and the entry surface of the light management component may be coincident or the same (see, e.g., FIGS. 1 & 3), in some instances they are not. For example, FIGS. 5 & 6 depict examples in which the exit surface of the void is not the same as the entry surface of the actual light management component.

Figure 3:
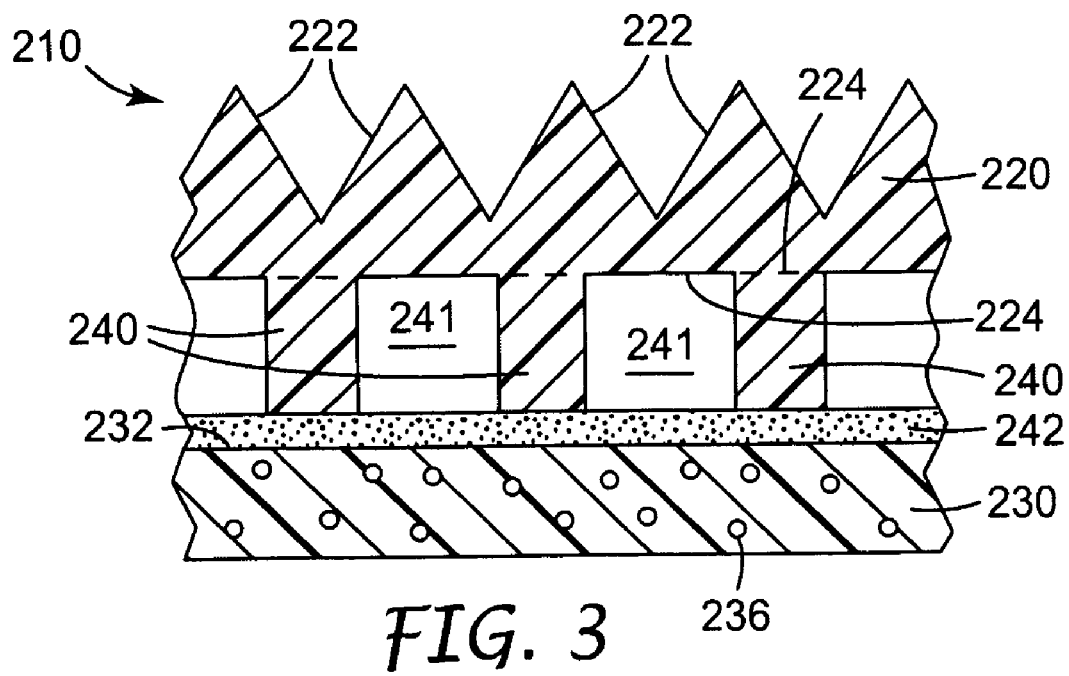
Figure 4:
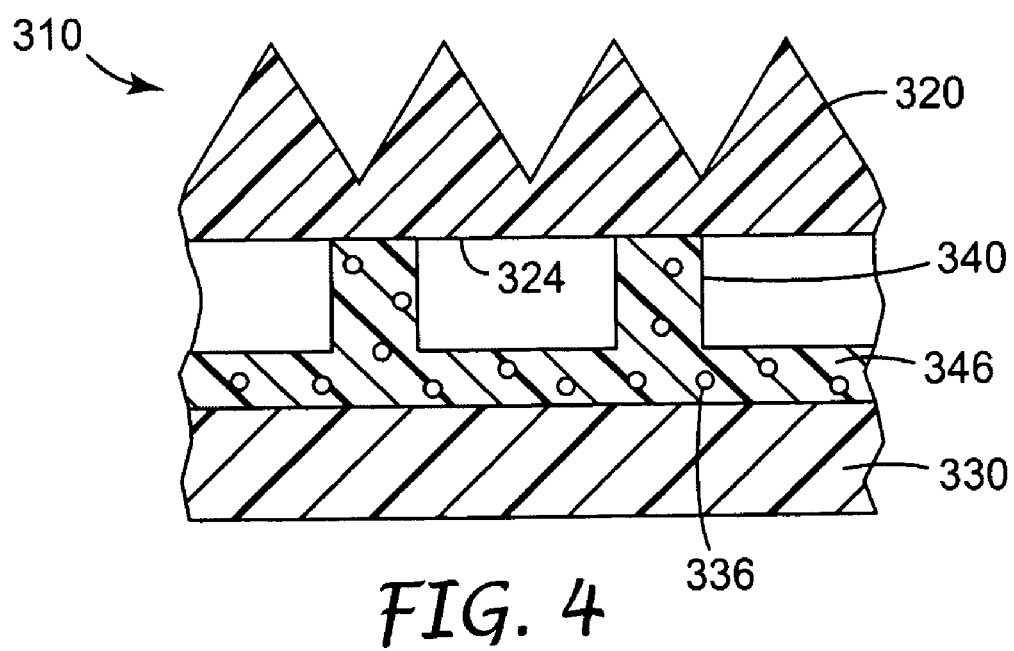

Similarly, the voids may be defined as including an entry surface, i.e., a surface through which light enters the void after exiting the light delivery component. Although the entry surface of the void and the exit surface of the light delivery component may be coincident or the same (e.g., see FIG. 1), in some instances they are not. For example, FIGS. 3–5 depict examples in which the exit surface of the actual light delivery component and the entry surface of the voids are not the same.

FIG. 1 is a partial cross-sectional view of one illustrative optical assembly according to the present invention. The optical assembly 10 includes a light management component 20 attached to a light delivery component 30 in the form of a diffusing body. Voids 41 are defined between the light management component 20 and the light delivery component 30 such that a significant portion of the entry surface 24 is occupied by the voids 41. As used in connection with the present invention, the attachment between the light management component 20 and light delivery component 30 may be adhesive, with the adhesive being a pressure sensitive adhesive or any other adhesive, such as a curable adhesive.

Light management component 20 may take a variety of forms, although the depicted light management component 20 includes an array of prisms 22 on the opposite side of the light management component from its entry surface 24. As such, the light management component 20 may have a prismatic structured surface such as those described above (e.g., BEF, etc.). The light management component 20 may be made of any suitable transparent material having an index of refraction greater than that of air, although it may be desired that materials with higher indices of refraction be used, such as, e.g., polycarbonate (with an index of refraction of 1.586).

Some examples of suitable light management component constructions with prismatic structured surfaces may include, but are not limited to, Brightness Enhancement Film (BEF I or BEF II), Transparent Right Angle Film (TRAF), Optical Lighting Film (OLF or SOLF), or Diamond Grade Sheeting, all of which are available from 3M Company, St. Paul, Minn. Other examples of light management component constructions may include the rounded peak/valley films described in U.S. Pat. Nos. 5,394,255 and 5,552,907 (both to Yokota et al.).

As seen in FIG. 1, it may be preferred that the entry surface 24 of the light management component be substantially smooth such that refraction of light into the light management component 20 through the entry surface 24 is uniform. The depicted light delivery component 30 includes a bottom surface 34 facing away from the light management component 20. As used herein, relational terms such as "top," "bottom," "side," etc. are used only to facilitate understanding of the illustrative embodiments in connection with the figures and those terms should not be construed to limit the scope of the invention unless explicitly required. The depicted bottom surface 32 is smooth, it is not required to be smooth.

In the depicted construction, the spacers 40 are formed as a unitary construction with the light delivery component 30. As used herein, a "unitary construction" is one in which the spacers 40 and the light delivery component 30 are formed from a continuous mass of material as in, e.g., a molding, thermoforming, casting, or similar process. Alternative constructions for the spacers 40 in optical assemblies according to the invention are described below.

Another feature depicted in FIG. 1 is that only a portion of the entry surface 24 is occupied by the spacers 40 that are located between the light delivery component 30 and the light management component 20. As noted above, the spacers 40 may occupy 10% or less (or in some instances 5% or less) of the area of the entry surface 24. Those areas in which the spacers 40 are in direct contact with the entry surface 24 may still refract light. Alternatively, the light incident upon the entry surface 24 in the areas occupied by the spacers 40 may be reflected away from the entry surface 24 or it may be absorbed (if, for example, an absorbing material is located at the interface of the entry surface 24 and the spacers 40).

Limiting the portion of the entry surface 24 occupied by the spacers 40 preferably increases the area free of contact with the spacers 40. Those areas of the entry surface 24 that are not occupied by the spacers 40 may be defined as voids 41. Within the voids 41, it may be preferred that the entry surface 24 be exposed to air such that an air/entry surface interface is formed to retain the refractive characteristics of the light management component 20.

In addition to occupying only a portion of the entry surface 24 of the light management component 20, the spacers 40 are preferably distributed over the entire entry surface 24. In other words, the spacers 40 are preferably not restricted to, e.g., the edges of the entry surface 24. It may be more preferred that the spacers 40 be uniformly distributed over the entry surface 24 of the light management component 20. Although a uniform distribution may be preferred, the spacers 40 may be provided in a regular pattern, irregular pattern, random distribution, etc.

In a similar manner to their relationship with the entry surface 24 of the light management component 20, the spacers 40 may also occupy only a portion of the exit surface 32 of the light delivery component 30. Although the spacers 40 are depicted in FIG. 1 as having a uniform cross-section such that they occupy the same amount of the exit surface 32 of the light delivery component 30 as they occupy of the entry surface 24 of the light management component 20, that relationship is not required. In other words, the spacers 40 may occupy the same portion of the exit surface 32 as they do of the entry surface 24, or they may occupy more or less of the exit surface 32.

The shape, size and lateral spacing distance of the spacers 40 may vary. For example, the spacers may be formed as posts (e.g., round, square, triangular, elliptical, irregularly shaped, etc.) that occupy discrete areas of, e.g., the entry surface 24. Alternatively, the spacers 40 may be formed as ribs or other elongated structures that extend from, e.g. edge-to-edge, over the optical assembly. In some embodiments, post-like structures and rib-like structures may be combined.

Although the spacers 40 may be provided as discrete structures (e.g., posts, ribs, etc.), in other embodiments the spacers 40 may be provided in the form of cells, e.g., hexagonal, triangular, square, rectangular, etc., with each cell defining one of the voids 41. In such a design, each of the voids 41 may be independent, with substantially no fluid communication between the voids 41. In other embodiments, e.g., where spacers 40 are posts or other structures that do not form independent voids 41, the voids 41 may be interconnected. Characterized in another manner, the plurality of voids 41 depicted in FIG. 1 may actually be portions of one large void in which the spacers 40 are located.

Furthermore, shape variations in the spacers may be seen between different optical assemblies and/or within the same optical assembly. Further, the size of the spacers may vary, both between different optical assemblies and within the same optical assembly. Also, lateral distance between the spacers may also vary between different optical assemblies and/or within the same optical assembly. Regardless of variations in shape, size, and lateral distances, the amount of surface are occupied by the spacers 40 preferably remains within the limits described above. Also, the variations in shape, size, and/or spacing may be provided to reduce or prevent undesired optical effects, e.g., moiré, etc.

Figure 2:
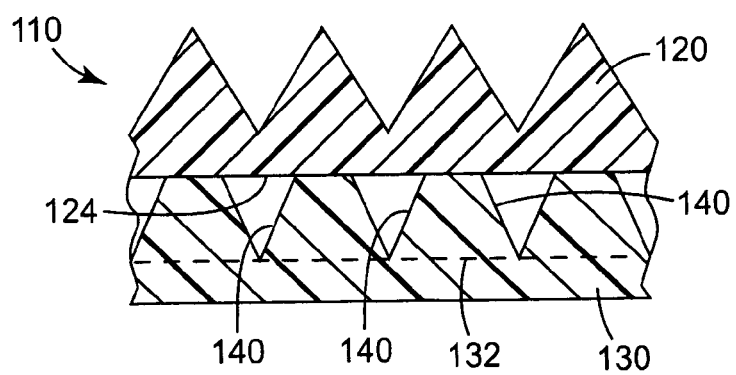

For purposes of the present invention, the exit surface 32 of the light delivery component 30 is defined as a surface above which the spacers 40 are located, even though in some embodiments the exit surface 32 may not be exposed or may be only minimally exposed. In FIG. 1, due to the unitary construction of the spacers 40 and the light delivery component 30, the exit surface 32 can be characterized as extending underneath the area occupied by the spacers 40 (indicated by broken lines underneath each spacer 40 in FIG. 1. That principle is illustrated in FIG. 2, in which the light delivery component 130 of the optical assembly 110 includes spacers 140 that occupy substantially all of the exit surface 132 of the light delivery component 130. The tapered shape of the spacers 140, however, ensures that they occupy only a portion of the entry surface 124 of the light management component 120.

Returning to FIG. 1, in addition to occupying only a portion of the entry surface 24 of the light management component 20 and defining voids 41 in which an air interface is maintained, the spacers 40 also preferably provide a structure by which the light management component 20 and the light delivery component 30 can be attached to each other. In the embodiment of FIG. 1, the portions of the spacers 40 in contact with the entry surface 24 of the light management component 20 may include an adhesive 42 or other bonding composition that attaches the spacers 40 to the entry surface 24. Suitable adhesives may include, for example, pressure sensitive adhesives, curable adhesives, solvent-based adhesives, etc. The adhesive may be optically clear, diffusive, absorptive, reflective, etc. as desired.

As discussed above, the light delivery component 30 of the depicted embodiment diffuses light before it enters the entry surface 24 of the light management component 20. As used herein, the terms "diffuses," "diffusion" and variations thereof mean that light changes direction as it passes through the light delivery component 30 from the direction along which it approached the light delivery component 30. The changes in direction may preferably be such that features located on the opposite side of the light delivery component 30 from the light management component 20 cannot be visually discerned by the naked human eye.

The diffusion provided by the light delivery component 30 may be close to Lambertian (where the diffused light is substantially uniform in all directions from zero to 90 degrees from a normal axis) or anisotropic as discussed in, e.g., U.S. Pat. No. 6,381,068 to Harada et al. The diffusion may or may not be wavelength dependent. In addition, the diffusion may or may not be polarization sensitive, i.e., the diffusion may occur for light of all polarization orientations or the diffusion may be selective for light of one or more polarization orientations. Examples of polarization sensitive diffusion and articles to accomplish the same may be described in, for example, U.S. Pat. Nos. 6,111,696 & 6,239,907 (both to Allen et al.).

The light delivery component 30 may exhibit a variety of optical properties. These optical properties may be selected to complement the optical properties of the light management component 20 and any other optical components through which the light will reach after passing through the light delivery component 30. The optical properties that may be exhibited by the light delivery component 30 include, but are not limited to, relatively high forward transmission of incident light (if the light delivery component is a diffuser) and polarization preservation for light passing through the light delivery component 30 to the light management component 20.

The first optical property listed above, high forward transmission of light, e.g., transmission of not less than about 70%, more preferably not less than about 80%, of incident light, can prevent or reduce reflection of ambient light from the light delivery component 30 before the light reaches the light management component 20. The high forward transmission may be exhibited for light traveling in both directions through the light delivery component 30, or it may be higher in one direction.

Another optical property that may be exhibited by a light delivery component 30 used in connection with the present invention is polarization preservation. In other words, the light delivery component may not convert or otherwise affect the polarization state of a substantial portion of the light passing through the light delivery component 30 towards the light management component 20. This optical property may be useful in connection with optical components that rely on the polarization of properties of light, e.g., Liquid Crystal Display (LCD) devices, etc.

The depicted light delivery component 30 is a bulk diffuser including bulk diffusing particles 36 incorporated into the light delivery component 30 to provide the desired diffusion of light. Although not required, the spacers 40 may also include the bulk diffusing particles 36. Furthermore, if desired, adhesive 42 provided between the spacers 40 and the entry surface 24 of the light management component may also act as a diffuser. Alternatively, the adhesive 42 may be optically clear. Bulk diffusers may include a transparent base material and at least one light-diffusing material, such as a pigment and/or beads, dispersed in the transparent base material. The pigments used may include a white pigment (for example, titanium oxide) and may also include one or more colored pigments, e.g., carbon black.

FIG. 3 depicts another embodiment of an optical assembly according to the present invention. The optical assembly 210 includes an light management component 220 and a light delivery component 230 separated by spacers 240 and voids 241. The spacers 240 in this embodiment are unitary with the light management component 220 rather than the light delivery component 230 as in the embodiments depicted in FIGS. 1 and 2. Similar to the embodiments described above, the spacers 240 occupy only a portion of the entry surface 224 of the light management component 220.

In a difference from the embodiment depicted in FIG. 1, the exit surface 232 of the light delivery component 230 includes adhesive 242 or another bonding composition that attaches the spacers 240 to the exit surface 232. Suitable adhesives may include, for example, pressure sensitive adhesives, curable adhesives, solvent-based adhesives, etc. The adhesive may be optically clear, diffusive, etc. as desired. It should be noted, however, that if the adhesive 242 covers significant portions or substantially all of the exit surface 232 of the light delivery component 230, it preferably transmits significant portions of the light incident on the exit surface 232 from within the light delivery component 230.

FIG. 4 depicts another illustrative embodiment of an optical assembly 310 according to the present invention. The optical assembly 310 includes a light management component 320 with an entry surface 324. Spacers 340 are attached to the entry surface 324. The spacers 340 are, themselves, attached to each other through a base layer 346. The base layer 346 is itself attached to another substrate 330. It should be understood, however, that substrate 330 is optional. In the embodiment depicted in FIG. 4, the spacers 340 and their base layer 346 serve as a bulk diffuser of light entering the light management component 320 through its entry surface 324. In the depicted embodiment, the materials used to form the spacers 340 and base layer 346 includes diffusing particles 336 located therein. As a result, light passing through the materials of spacers 340 and base layer 346 is diffused before reaching the entry surface 324 of light management component 320.

FIG. 5 depicts another embodiment of an optical assembly 410 according to the present invention. The optical assembly of FIG. 5 includes two light management components 420 and 470. As depicted, the light management components 420 and 470 include prismatic structured surfaces, such as, e.g., BEF. In the embodiment of FIG. 5 the prismatic structures are depicted as having a crossed configuration, in other words the prisms are not aligned (with the broken line in light management component 470 depicting the valley located between each of the prisms in light management component 470).

The optical assembly of FIG. 5 also includes a plurality of spacers 440 located between a light delivery component 460 and the light management component 420. The spacers 440 are depicted as attached to a base layer 450 although they may be integral with that layer (as seen in FIG. 4). Layers of adhesive 442 and 444 are located on each side of the spacers 440 and base layer 450. Adhesive layer 442 is used to attach the base layer 450 two light management component 420. Adhesive 444 attaches the spacers 440 to the light delivery component 460. In this embodiment, it may be desirable that the materials used for base layer 450 and adhesive 442 have an index of refraction that substantially matches that of the materials used for light management component 420. As a result, light entering the light management component 420 can be properly refracted. Adhesive layer 444 may beneficially diffuse light passing from light delivery component 460 into the voids between spacers 440.

FIG. 6 depicts another optical assembly according to the principles of the present invention. The optical assembly 510 includes a light management component 520 with an entry surface 524. Also included in optical assembly 510 are spacers 540 attached to a base layer 550. In the depicted embodiment, the base layer 550 is unitary with the spacers 540. The spacers 540 are each attached to the surface 562 of a light delivery component 560 located at the bottom of optical assembly 510 as seen in FIG. 6.

Light delivery component 560 may be, e.g., a light guide with the contact points between spacers 540 and surface 562 of the light delivery component 560 serving as extraction points at which light is extracted from the light delivery component 560. The extracted light can travel into the light management component 520 through its entry surface 524. In this embodiment, it may be desired that the materials used for base layer 550 and spacers 540 have an index of refraction that is substantially matched with the index of refraction used to manufacture the light management component 520. Also depicted in this embodiment are diffusing particles 536 located within the materials used to manufacture base layer 550 and spacers 540. As such, light exiting the optical body 560 and entering the light management component 520 through its entry surface 524 can be diffused.

Figure 7:
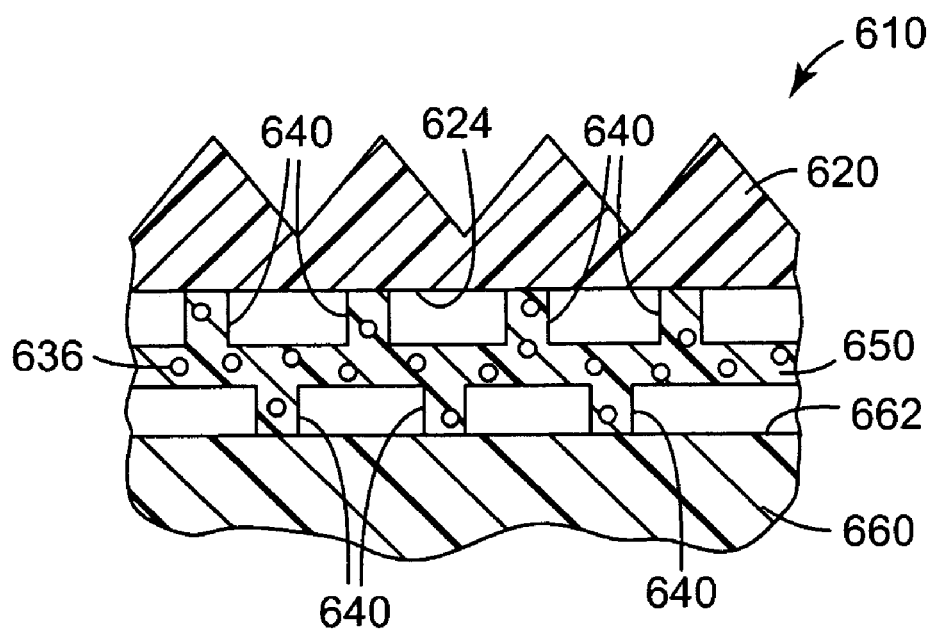

Still another optical assembly is seen in FIG. 7 where optical assembly 610 includes a light management component 620 at its top and a light delivery component 660 at its bottom. As in the embodiment depicted in FIG. 6, optical assembly 610 may, for example, including light delivery component 660 in the form of a light guide. As a result, spacers 640 located in contact with surface 662 of light delivery component 660 may be used to extract light as it moves through the light guide of light delivery component 660. Spacers 640 are formed integral with a base layer 650 which also includes spacers 640 on its opposite side, in other words, the side of base layer 650 that faces entry surface 624 of light management component 620.

The base layer 650 and/or the spacers 640 may preferably include diffusing particles 636 or otherwise act to diffuse light exiting the light delivery component 660 and entering light management component 620 through its entry surface 624. One potential advantage of the construction seen in FIG. 7 is that a plurality of voids are maintained over entry surface 624 such that it may not be required to match the index of refraction between the material used for light management component 620 and base layer 650 (as in optical assembly 510 described above).

Figure 8:
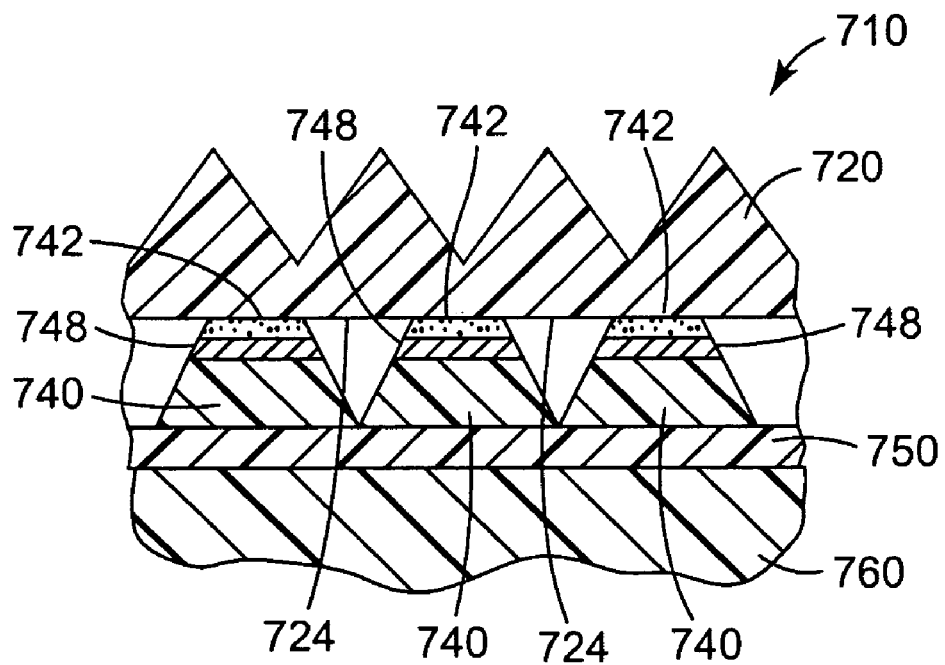

Optical assembly 710 as seen in FIG. 8 illustrates other features that may be suitable for use in connection with the present invention. For example, the spacers 740 located between a base layer 750 and light management component 724 may include a reflective layer 748 proximate points at which the spacers 740 contact the entry surface 724 of light management component 720. The reflective layer 748 may be in the form of, e.g., a metallized layer or other reflective material. In the depicted embodiment, the spacers 740 are attached to the entry surface 724 of light management component 720 through a layer of adhesive 742. One potential advantage of the construction seen in FIG. 8 is that light may be prevented from passing directly from the interior of the spacers 740 into the light management component 720.

The plurality of spacers 740 are attached to a base layer 750 which is, in turn, attached to an optional light delivery component 760. It may be preferred that the base layer 750 be diffusing or that light from the light delivery component 760 be diffuse before passing into the spacers 740 or the voids formed by spacers 740 between base layer 750 and light management component 720.

Figure 9:
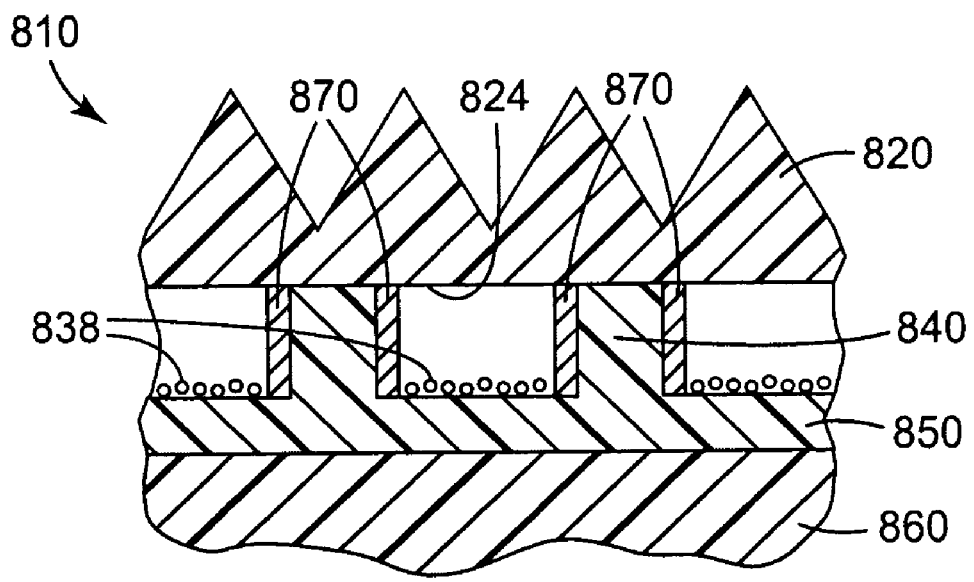

FIG. 9 depicts an optical assembly 810 that includes a light management component 820 and a light delivery component 860. The base layer 850 and spacers 840 are located between the light management component 820 and the light delivery component 860. Spacers 840 define voids between base layer 850 and the entry surface 824 of the light management component 820. Also seen in FIG. 9 are a plurality of diffusing particles 838 located on the surfaces of base layer 850 between spacers 840.

The diffusing particles 838 may be replaced, in some instances, by, e.g., another surface diffuser or other structured surface such as a microstructured surface, an optically rough surface etc. In such instances, it may be preferred that the particles 838 or other structure (at what can be referred to as the entry surfaces of the voids 841) be an air interface (or other gas) such that the refraction of light as it enters the voids 841 is not disturbed by a lower refraction index ratio.

Another optional feature depicted in FIG. 9 it is the use of a layer of reflective material 870 on the sides of spacers 840. The reflective material 870 may prevent light exiting the base layer 850 between the spacers 840 from subsequently entering the spacers 840 through their side surfaces (i.e., the surfaces on which the reflective material 870 is located). In addition, it may be advantageous to provide the reflective material 870 between the spacers 840 and entry surface 824 of light management component 820 in a manner similar to that depicted in connection with FIG. 8.

Figure 10:
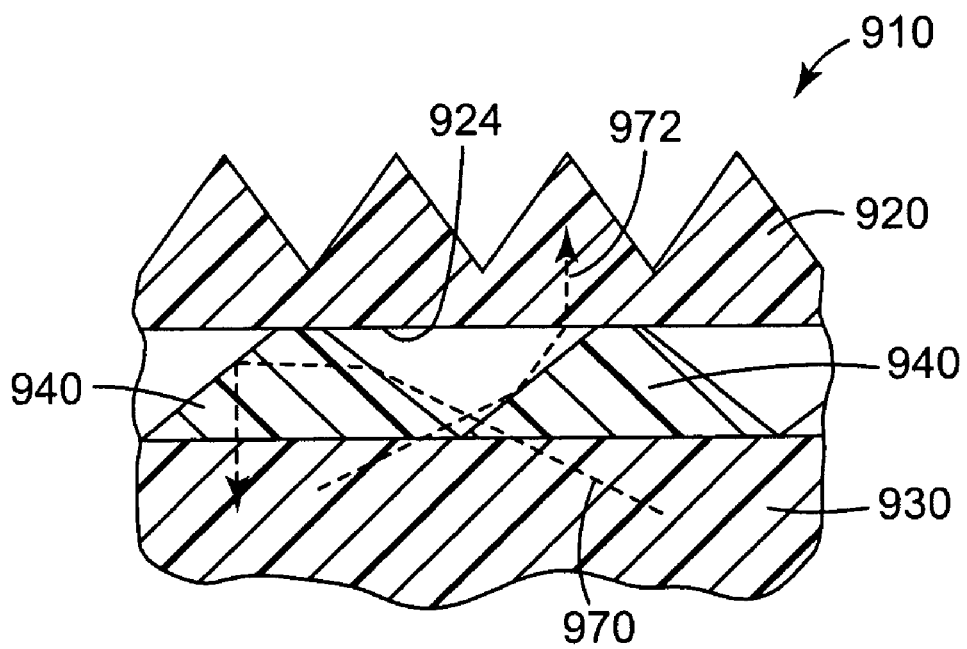

FIG. 10 depicts another optical assembly 910 that also includes a light management component 920 with an entry surface 924. Spacers 940 are attached to the entry surface 924 of light management component 920 in a manner that forms voids between the spacers 940 and a light delivery component 930 located beneath the spacers 940. It may be preferred that the light delivery component 930 be a diffusing structure such that light passing through light delivery component 930 is diffused before reaching entry surface 924 of light management component 920.

Optical assembly 910 as depicted in FIG. 10 includes to rays of light 970 and 972 that are provided to illustrate an alternative way to prevent light within the voids formed between spacers 940 from reentering the spacers 940. For example, ray 970 exits a spacer 940 and enters the void located between spacers 940 and entry surface 924. While in that void, ray 970 enters the adjacent spacer 940, where it is refracted and reflected back into light delivery component 930.

Ray 972 exits light delivery component 930 and enters one of the spacers 940. Ray 972 exits the spacer 940 into the void formed by spacers 940 with entry surface 924. The ray 972 is incident on a side surface of spacer 940 body and is reflected off of that side surface where it is incident on entry surface 924 of light management component 920. Ray 972 is then refracted into the light management component 920 at that location. In this embodiment, the geometry of the spacers and materials selected for them are such that at least a substantial portion of light is prevented from entering the side surfaces of spacers 940 by reflection in the absence of a reflective coating as used in optical assembly 810 described above.

Figure 11:
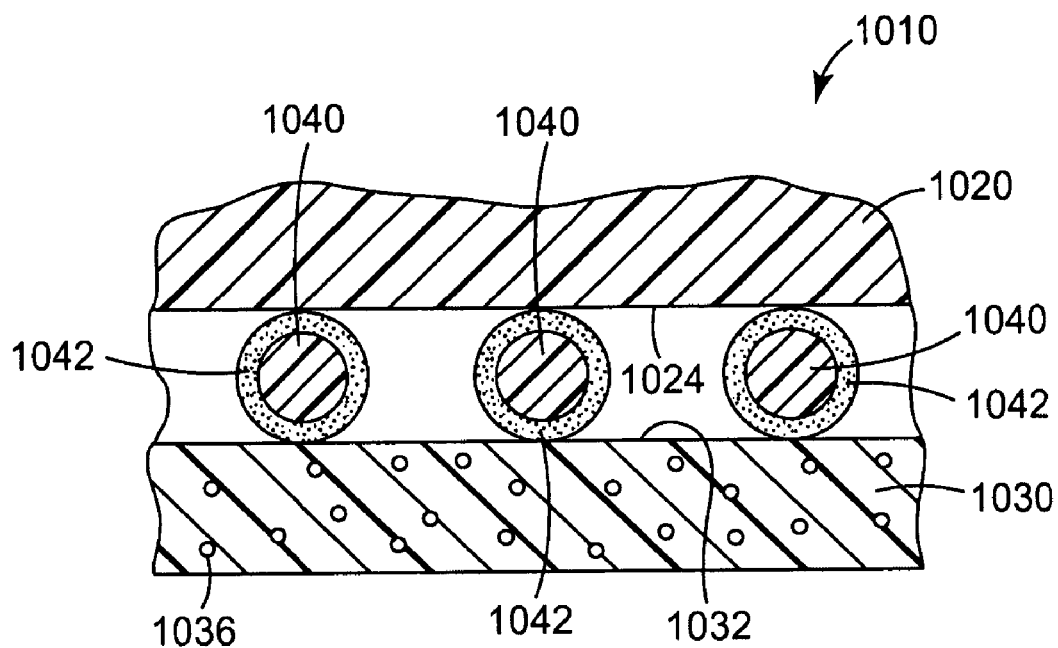

An optical assembly 1010 is depicted in connection with FIG. 11 and includes a light management component 1020 separated from a light delivery component 1030 by a plurality of spacers 1040. The spacers 1040 are, in the depicted embodiment, in the form of spheres or beads which may themselves be transmissive or reflective. Each of the spacers 1040 is depicted as coated with a layer of adhesive 1042 such that the spacers 1040 attach the light delivery component 1030 to the entry surface 1024 of light management component 1020. In the depicted embodiment, the light passing through light delivery component 1030 is diffused by, e.g., diffusing particles 1036 located within light delivery component 1030. As such, light exiting the light delivery component 1030 through its exit surface 1032 is diffused before it enters the entry surface 1024 of light management component 1020.

Figure 12:
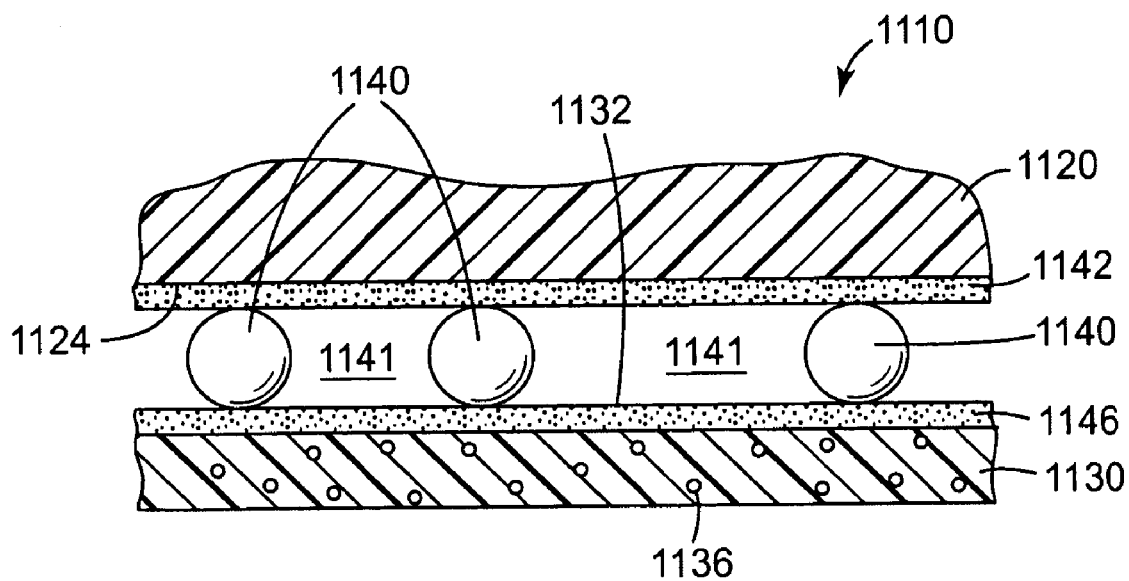

FIG. 12 depicts an optical assembly 1110 that includes a light management component 1120 and a light delivery component 1130 separated by spacers 1140 and voids 1141. In the depicted embodiment, the spacers 1140 are in the form of beads, between which voids 1141 are formed between light delivery component 1130 and light management component 1120. Light delivery component 1130, in the depicted embodiment, includes light diffusing particles 1136, although the diffusing particles may be optional.

Also seen in the FIG. 12 is a layer of adhesive 1142 located on entry surface 1124 of light management component 1120. The adhesive layer 1142 may preferably be optically clear such that light refracting through the adhesive layer 1142 is not diffused. Another layer of adhesive 1146 is located on exit surface 1132 of light delivery component 1130. The two layers of adhesive 1142 and 1146 operate with spacers 1140 to connect or attach light management component 1120 to light delivery component 1130 while maintaining voids 1141 between the spacers 1140.

In contrast with the adhesive 1142, adhesive layer 1146 located on exit surface 1132 of light delivery component 1130 may diffuse light exiting exit surface 1132 and traveling towards the entry surface 1124 of light management component 1120. Furthermore, spacers 1140 may be transmissive or reflective as needed to obtain desired optical properties for the optical assembly 1110.

Figure 13:
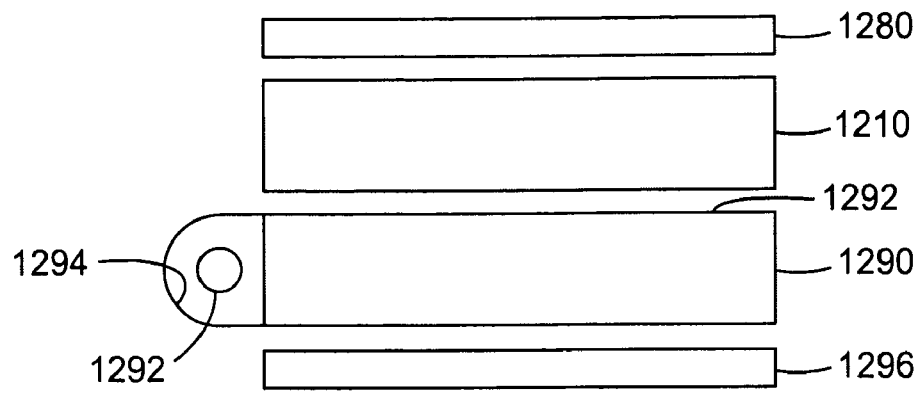
FIG. 13 is a diagram of one optical display system including an optical assembly according to the present invention.

FIG. 13 depicts one embodiment of an optical display system that includes an optical assembly 1210 according to the present invention in connection with various other components to obtain a desired optical result, e.g., display an image to a viewer. For example, the optical system of FIG. 13 includes a light guide 1290, a light source 1292, and a reflector 1294, adapted to reflect light from light source 1292 into light guide 1290. Light guide 1290 is preferably manufactured or designed to distribute light over its surface 1292 such that the light enters optical assembly 1210 (which may include a variety of components as described above). The system also includes a back reflector 1296 positioned to reflect light escaping from the back side of the light guide 1290.

The light, after passing from light guide 1290 into optical assembly 1210, enters a display component 1280 that may be, for example, a liquid crystal display or similar device that requires light to provide an image or other effect. It will be understood that optical assembly 1210 may include one or more light management components (see, for example, FIG. 5). Furthermore, it will be understood that the optical assembly 1210 may be fixedly attached to the light guide 1290 as seen in, for example, FIG. 6.

The materials and techniques used to manufacture the components such as light management components, light delivery components, light guides, etc. will be well known to those of skill in the art. For example, light guide 1290 and associated light source 1292 and reflector 1294 may be replaced by an electroluminescent panel, additional components such as back reflectors, reflective polarizers, etc. may be included in the optical display system. For some relevant discussions regarding optical display systems and the components that may be included in them, see, e.g., U.S. Pat. No. 5,268,782 (Wenz et al.); U.S. Pat. No. 5,394,255 (Yokota et al.); U.S. Pat. No. 5,552,907 (Yokota et al.); U.S. Pat. No. 5,825,542 (Cobb, Jr. et al.); U.S. Pat. No. 5,917,664 (O'Neill et al.); U.S. Pat. No. 6,052,164 (Cobb, Jr. et al.); U.S. Pat. No. 6,091,547 (Gardiner et al.); U.S. Pat. No. 6,111,696 (Allen et al.); U.S. Pat. No. 6,117,530 (Jonza et al.); U.S. Pat. No. 6,166,797 (Bruzzone et al.); U.S. Pat. No. 6,239,907 B1 (Allen et al.); and U.S. Pat. No. 6,356,391 B1 (Gardiner et al.).

The spacers and associated structures (e.g., base layers) used to define the voids between the light management components and the light delivery components of optical assemblies according to the invention may, however, be formed of materials that may differ from those commonly used in the manufacture of optical components. It may be desired, for example, that the spacers and/or associated structures exhibit some adhesive properties when they are used to attach light delivery components or other structures to the entry surface of a light management component. Further, the materials used for the spacers and associated structures preferably retain a desired structure both during manufacturing and as a finished product.

In some embodiments, it may be desirable to use an adhesive that can be referred to as a structural hybrid adhesive with two stages. In a first stage, the structural hybrid adhesive may exhibit characteristics commonly associated with pressure sensitive adhesives. In the first stage, the materials may be relatively soft such that long term storage or use may degrade any structures formed in the material. In a second stage, however, the structural hybrid adhesive may be cured such that it retains a desired structure and at least some of the adhesive properties of the first stage such that any structures attached to be structural hybrid adhesive during its first stage remain attached after the structural hybrid adhesive has been cured to its second stage. As used in connection with the present invention, the term "curable" means a material that undergoes an irreversible change in modulus after exposure to one or more of a curing agent, heat, and/or radiation. The term "radiation" includes actinic radiation such as, e.g., electromagnetic radiation in the UV or visible range of the electromagnetic spectrum, electron beam radiation, etc. Such curable materials may include various components such as diffusing particles, conductive particles, fibers, etc. to provide desired optical or other properties.

Structural hybrid adhesives may be formed into the desired structures (e.g., spacers as seen in connection with many of the embodiments described above) by the use of casting, embossing, micro-embossing, or any other suitable technique. If embossed or micro-embossed, the structures may be formed using an embossed or micro-embossed liner that includes a layer of release material (material to which the structural hybrid adhesive exhibits low adhesion).

Figure 14A:
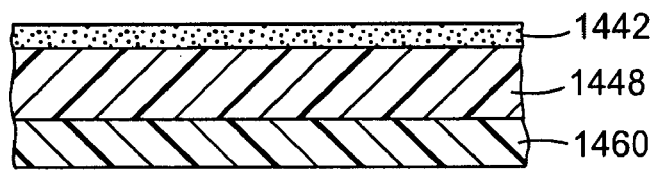
FIGS. 14A–14C are partial cross-sectional diagrams of one method of forming a structure for use in an optical assembly according to the present invention.
Figure 14B:
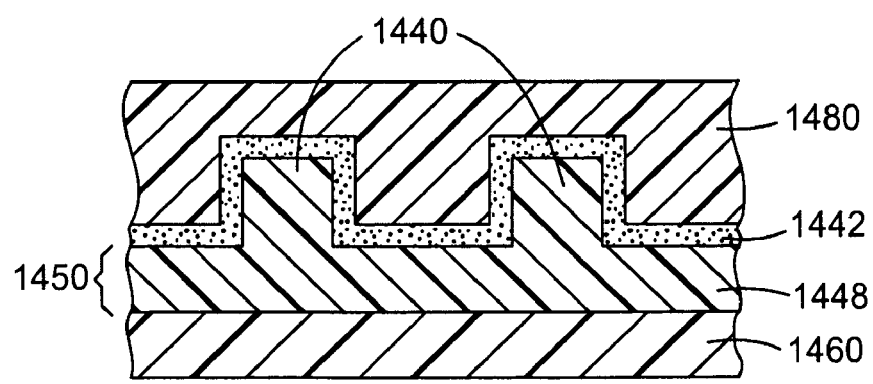
Figure 14C:
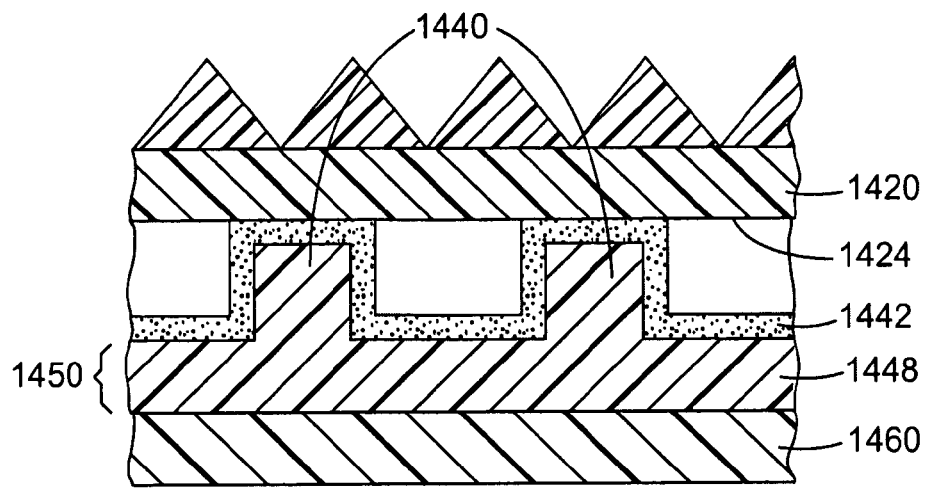

In place of forming the spacers and associated structures from a structural hybrid adhesive, the spacers and associated structures may be formed using a multilayer system as illustrated in FIGS. 14A–14C. As seen in FIG. 14A, the multilayer system includes a layer 1448 of curable material on a backing 1460. The backing 1460 may be, e.g., a polymeric film, glass, metal or any other suitable substrate on which the layer 1448 of curable material can be located. A layer of pressure sensitive adhesive 1442 is also included in the multilayer system, with the layer 1448 of curable material being located between the pressure sensitive adhesive 1442 and the backing 1460. Although only three layers are depicted, it will be understood that a multilayer system could include more layers than those depicted in FIG. 14A.

The term "pressure sensitive adhesive" as used herein refers to a category of adhesives that, in solvent-free form, are aggressive and permanently tacky at room temperature and firmly adhere to a variety of dissimilar surfaces upon contact without the need of more than finger or hand pressure. They require, for example, no activation by a curing agent, heat, radiation or solvent to exert a strong holding force toward materials such as paper, plastic, glass, wood, cement, and metals.

Turning to FIG. 14B, the multilayer system of FIG. 14A is embossed or otherwise deformed such that the curable material 1448 is formed into a structure that includes spacers 1440 and a base layer 1450. The embossing may be performed using, e.g., a structured liner 1480 that includes recesses in the shape of the desired spacers 1440. This embossing is preferably performed before the curable material of layer 1448 is cured such that the structure of the liner 1480 is essentially replicated by the pressure sensitive adhesive 1442 and curable material 1448. It may be preferred that the pressure sensitive adhesive 1442 retain its integrity during deformation of the curable material 1448 such that, after deformation, the spacers 1440 and associated base layer 1450 are covered by the layer of pressure sensitive adhesive 1442. Alternatively, it may be sufficient if only the spacers 1440 retain the pressure sensitive adhesive 1442.

With the structures thus formed in FIG. 14B, the curable material is cured such that the spacers 1440 and base layer 1450 retain their structural integrity. In some instances, the curing may be only partial, such that the structures may be retained during further manufacturing, with complete curing being performed.

After sufficient curing to retain the structures seen in FIG. 14B, the liner 1480 is removed and the spacers 1440, base layer 1450 and attached backing 1460 are attached to the entry surface 1424 of an light management component 1420. If the curable material 1448 was only partially cured after deformation to form the spacers 1440, then curing may be completed after attachment to the light management component 1420.

In connection with the multilayer system of FIGS. 14A–14C, different layers may include various components such as diffusing particles, conductive particles, fibers, etc. to provide desired optical or other properties. For example, the curable material may include diffusing particles dispersed therein, the backing 1460 may include diffusing particles, etc.

The approaches to providing adhesive structures described above may be further supplemented by the discussions of the microstructured liners and pressure sensitive adhesives that can form adhesive structures as described in, e.g., U.S. Pat. No. 6,197,397 B1 (Sher et al.). Furthermore, processes and materials for providing curable adhesives that may be used in connection with the invention may also be described in U.S. patent application Ser. No. 10/157,260, titled SEGMENTED CURABLE TRANSFER TAPES, filed on May 28, 2002 U.S. patent application Ser. No. 10/005,669, titled HYBRID ADHESIVE ARTICLES AND METHODS, by Yang et al., filed Nov. 2, 2001; PCT Publication Number WO03/102101, titled ADHESIVE TAPES, filed on May 28, 2002 on behalf of 3M Innovative Properties Co. as applicant; and U.S. Provisional Patent Application Ser. No. 60/383,756, titled CURABLE ADHESIVE STRUCTURES, filed on May 28, 2002.

Figure 15:
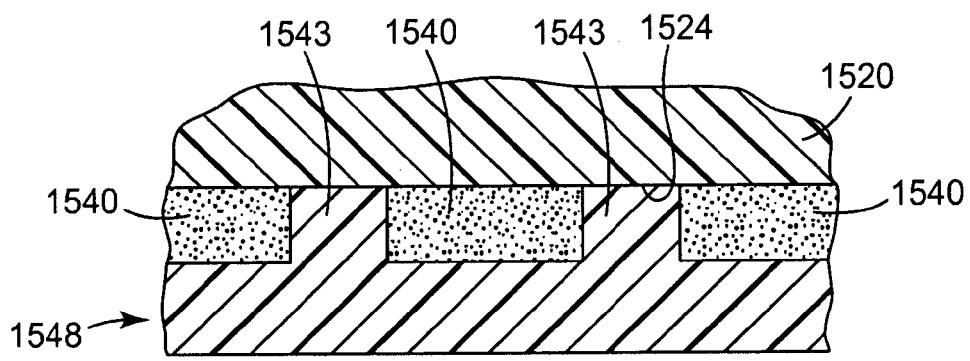
FIGS. 15 & 16 are partial cross-sectional diagrams of curable adhesives and liners attached to a light management component in accordance with the present invention.

When curable structural hybrid adhesives are used to manufacture an optical assembly according to the present invention, it may be advantageous to supply the structural hybrid adhesives on a release liner, e.g. a structured liner, with the curable adhesive attached to the entry surface of the light management component. One such embodiment is depicted in FIG. 15, with the curable adhesive 1540 located between a light management component 1520 and a structured release liner 1548. When eventually removed from the construction, the structures 1543 of the release liner 1548 separating portions of the curable adhesive 1540 will form the voids described in the constructions above. The curable adhesive 1540 may preferably not be fully cured, such that after removing the release liner 1548 (and leaving the curable adhesive 1540 attached to the entry surface 1524 of the light management component 1520), the curable adhesive 1540 can be attached to a light delivery component (see above) and cured to form an optical assembly including a light management component 1520 and a light delivery component and associated voids located therebetween.

Figure 16:
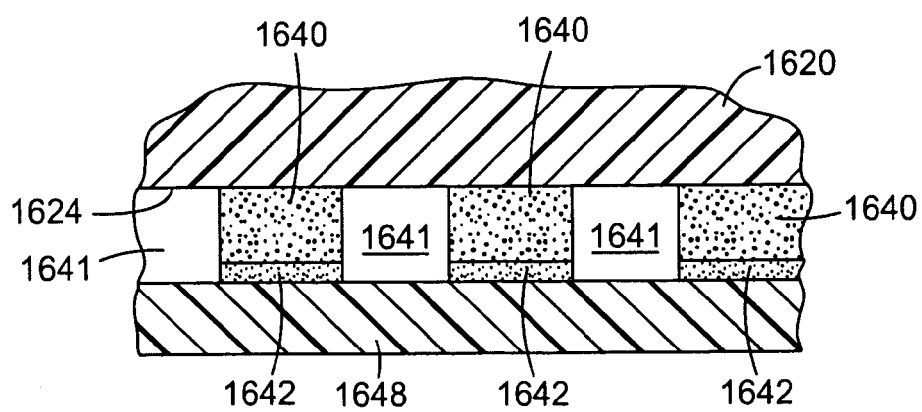

In another embodiment depicted in FIG. 16, curable adhesive 1640 is located between a light management component 1620 and a liner 1648. The curable adhesive 1640 preferably defines voids 1641 between the entry surface 1624 and the liner 1648. The curable adhesive 1640 in this embodiment may be (but is not necessarily) fully cured because the construction includes a layer of pressure sensitive adhesive 1642 between the curable adhesive 1640 and the liner 1648. After removing the liner 1648, the pressure sensitive adhesive 1642 can be used to attach the curable adhesive 1640 to a light delivery component (see above), thereby providing an optical assembly including a light management component 1620 and a light delivery component and associated voids located therebetween.

In those embodiments involving a release liner, curable adhesive and light management component, methods of manufacturing an optical assembly according to the present invention may involve laminating the curable adhesive and liner combination to a light management component, followed by stripping the liner and laminating the opposite side of the curable adhesive to a light delivery component. Either or both laminations may be followed by at least some curing of the curable adhesive, with eventually complete curing of the curable adhesive.

All references and publications cited herein are expressly incorporated herein by reference in their entirety into this disclosure. Illustrative embodiments of this invention are discussed and reference has been made to possible variations within the scope of this invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below.

What is claimed is:

1. An optical assembly comprising:
   a light management component comprising an entry surface;
   a light delivery component comprising an exit surface facing the entry surface of the light management component;
   spacers located between the entry surface of the light management component and the exit surface of the light delivery component, wherein the spacers comprise discrete structures dispersed over the entry surface of the light management component;
   wherein the exit surface of the light delivery component is attached to the entry surface of the light management component at one or more attachment points, the one or more attachment points defining unfilled voids located between the exit surface and the entry surface;
   and wherein one or both of the light management component and the light delivery component exhibit an optical gain of one or more.

2. An optical assembly according to claim 1, wherein, outside of the voids, substantially all of the exit surface of the light delivery component is attached to the entry surface of the light management component within the optical assembly.

3. An optical assembly according to claim 1, wherein the voids are interconnected with each other.

4. An optical assembly according to claim 1, wherein the voids are independent of each other.

5. An optical assembly according to claim 1, wherein the voids contain air.

6. An optical assembly according to claim 1, wherein the voids comprise exit surfaces proximate the light management component, and further wherein the exit surfaces of the voids are flat.

7. An optical assembly according to claim 1, wherein the voids comprise exit surfaces proximate the light management component, and further wherein the exit surfaces of the voids are coincident with the entry surface of the light management component.

8. An optical assembly according to claim 1, wherein the voids comprise entry surfaces proximate the light delivery component, and further wherein the entry surfaces of the voids are coincident with the exit surface of the light delivery component.

9. An optical assembly according to claim 1, wherein the spacers occupy 10% or less of the entry surface of the light management component.

10. An optical assembly according to claim 1, wherein the spacers occupy 5% or less of the entry surface of the light management component.

11. An optical assembly according to claim 1, wherein the spacers comprise adhesive.

12. An optical assembly according to claim 1, wherein the spacers comprise curable adhesive.

13. An optical assembly according to claim 1, wherein the spacers comprise reflective surfaces.

14. An optical assembly according to claim 1, wherein the spacers comprise a layer of adhesive.

15. An optical assembly according to claim 1, wherein the spacers comprise a layer of pressure sensitive adhesive and curable material.

16. An optical assembly according to claim 1, wherein the light management component comprises first and second major surfaces, the first major surface comprising the entry surface and the second major surface comprising a prismatic structured surface.

17. An optical assembly according to claim 1, wherein the light delivery component comprises a diffuser.

18. An optical assembly according to claim 1, wherein the light delivery component comprises a light guide.

19. An optical assembly comprising:
a light management component comprising an entry surface;
a light delivery component comprising an exit surface facing the entry surface of the light management component;
spacers located between the entry surface of the light management component and the exit surface of the light delivery component, wherein the spacers comprise a base layer extending between the spacers;
wherein the exit surface of the light delivery component is attached to the entry surface of the light management component at one or more attachment points, the one or more attachment points defining unfilled voids located between the exit surface and the entry surface;
and wherein one or both of the light management component and the light delivery component exhibit an optical gain of one or more.

20. An optical assembly according to claim 19, wherein, outside of the voids, substantially all of the exit surface of the light delivery component is attached to the entry surface of the light management component within the optical assembly.

21. An optical assembly according to claim 19, wherein the voids are interconnected with each other.

22. An optical assembly according to claim 19, wherein the voids are independent of each other.

23. An optical assembly according to claim 19, wherein the voids contain air.

24. An optical assembly according to claim 19, wherein the voids comprise exit surfaces proximate the light management component, and further wherein the exit surfaces of the voids are flat.

25. An optical assembly according to claim 19, wherein the voids comprise exit surfaces proximate the light management component, and further wherein the exit surfaces of the voids are coincident with the entry surface of the light management component.

26. An optical assembly according to claim 19, wherein the voids comprise entry surfaces proximate the light delivery component, and further wherein the entry surfaces of the voids are coincident with the exit surface of the light delivery component.

27. An optical assembly according to claim 19, wherein the spacers occupy 10% or less of the entry surface of the light management component.

28. An optical assembly according to claim 19, wherein the spacers occupy 5% or less of the entry surface of the light management component.

29. An optical assembly according to claim 19, wherein the spacers comprise adhesive.

30. An optical assembly according to claim 19, wherein the spacers comprise curable adhesive.

31. An optical assembly according to claim 19, wherein the spacers comprise reflective surfaces.

32. An optical assembly according to claim 19, wherein the spacers comprise a layer of adhesive.

33. An optical assembly according to claim 19, wherein the spacers comprise a layer of pressure sensitive adhesive and curable material.

34. An optical assembly according to claim 19, wherein the spacers comprise bulk diffusing particles dispersed therein.

35. An optical assembly according to claim 19, wherein the light management component comprises first and second major surfaces, the first major surface comprising the entry surface and the second major surface comprising a prismatic structured surface.

36. An optical assembly according to claim 19, wherein the light delivery component comprises a diffuser.

37. An optical assembly according to claim 19, wherein the light delivery component comprises a light guide.

38. An optical assembly comprising:
a light management component comprising an entry surface;
a light delivery component comprising an exit surface facing the entry surface of the light management component;
spacers located between the entry surface of the light management component and the exit surface of the light delivery component, wherein the spacers comprise beads;
wherein the exit surface of the light delivery component is attached to the entry surface of the light management component at one or more attachment points, the one or more attachment points defining unfilled voids located between the exit surface and the entry surface;
and wherein one or both of the light management component and the light delivery component exhibit an optical gain of one or more.

39. An optical assembly according to claim 38, wherein, outside of the voids, substantially all of the exit surface of the light delivery component is attached to the entry surface of the light management component within the optical assembly.

40. An optical assembly according to claim 38, wherein the voids are interconnected with each other.

41. An optical assembly according to claim 38, wherein the voids contain air.

42. An optical assembly according to claim 38, wherein the voids comprise exit surfaces proximate the light management component, and further wherein the exit surfaces of the voids are flat.

43. An optical assembly according to claim 38, wherein the voids comprise exit surfaces proximate the light management component, and further wherein the exit surfaces of the voids are coincident with the entry surface of the light management component.

44. An optical assembly according to claim 38, wherein the voids comprise entry surfaces proximate the light delivery component, and further wherein the entry surfaces of the voids are coincident with the exit surface of the light delivery component.

45. An optical assembly according to claim 38, wherein the spacers occupy 10% or less of the entry surface of the light management component.

46. An optical assembly according to claim 38, wherein the spacers occupy 5% or less of the entry surface of the light management component.

47. An optical assembly according to claim 38, wherein the spacers comprise adhesive.

48. An optical assembly according to claim 38, wherein the spacers comprise reflective surfaces.

49. An optical assembly according to claim 38, wherein the light management component comprises first and second major surfaces, the first major surface comprising the entry surface and the second major surface comprising a prismatic structured surface.

50. An optical assembly according to claim 38, wherein the light delivery component comprises a diffuser.

51. An optical assembly according to claim 38, wherein the light delivery component comprises a light guide.

52. An optical assembly comprising:
a light management component comprising an entry surface;
a light delivery component comprising an exit surface facing the entry surface of the light management component;
spacers located between the entry surface of the light management component and the exit surface of the light delivery component, wherein the spacers comprise bulk diffusing particles dispersed therein;
wherein the exit surface of the light delivery component is attached to the entry surface of the light management component at one or more attachment points, the one or more attachment points defining unfilled voids located between the exit surface and the entry surface;
and wherein one or both of the light management component and the light delivery component exhibit an optical gain of one or more.

53. An optical assembly according to claim 52, wherein, outside of the voids, substantially all of the exit surface of the light delivery component is attached to the entry surface of the light management component within the optical assembly.

54. An optical assembly according to claim 52, wherein the voids are interconnected with each other.

55. An optical assembly according to claim 52, wherein the voids are independent of each other.

56. An optical assembly according to claim 52, wherein the voids contain air.

57. An optical assembly according to claim 52, wherein the voids comprise exit surfaces proximate the light management component, and further wherein the exit surfaces of the voids are flat.

58. An optical assembly according to claim 52, wherein the voids comprise exit surfaces proximate the light management component, and further wherein the exit surfaces of the voids are coincident with the entry surface of the light management component.

59. An optical assembly according to claim 52, wherein the voids comprise entry surfaces proximate the light delivery component, and further wherein the entry surfaces of the voids are coincident with the exit surface of the light delivery component.

60. An optical assembly according to claim 52, wherein the spacers occupy 10% or less of the entry surface of the light management component.

61. An optical assembly according to claim 52, wherein the spacers occupy 5% or less of the entry surface of the light management component.

62. An optical assembly according to claim 52, wherein the spacers comprise discrete structures dispersed over the entry surface of the light management component.

63. An optical assembly according to claim 52, wherein the spacers comprise adhesive.

64. An optical assembly according to claim 52, wherein the spacers comprise curable adhesive.

65. An optical assembly according to claim 52, wherein the spacers comprise reflective surfaces.

66. An optical assembly according to claim 52, wherein the spacers comprise a layer of adhesive.

67. An optical assembly according to claim 52, wherein the spacers comprise a layer of pressure sensitive adhesive and curable material.

68. An optical assembly according to claim 52, wherein the light management component comprises first and second major surfaces, the first major surface comprising the entry surface and the second major surface comprising a prismatic structured surface.

69. An optical assembly according to claim 52, wherein the light delivery component comprises a diffuser.

70. An optical assembly according to claim 52, wherein the light delivery component comprises a light guide.

* * * * *

UNITED STATES PATENT AND TRADEMARK OFFICE
CERTIFICATE OF CORRECTION

PATENT NO. : 7,095,943 B2
APPLICATION NO. : 11/297607
DATED : August 22, 2006
INVENTOR(S) : Robert M. Emmons It is certified that error appears in the above-identified patent and that said Letters Patent is hereby corrected as shown below:

Title Page (57),
Col. 2 (Abstract) Line 4, Delete "disclosed" and insert -- disclosed. --, therefore.

Column 9,
Line 11, Delete "an" and insert -- a --, therefore.

Column 14,
Line 49, Delete "an" and insert -- a --, therefore.

Column 15,
Line 3, After "2002" insert -- (Attorney Docket No. 57779US002); --.
Line 7, After "2002" insert -- (Attorney Docket No. 56172WO002) --.
Line 10, Delete "2002." And insert -- 2002 (Attorney Docket No. 57863US002). --, therefore.

Signed and Sealed this

Second Day of January, 2007

JON W. DUDAS
*Director of the United States Patent and Trademark Office*